United States Patent [19]

Meier

[11] Patent Number: 4,826,303

[45] Date of Patent: May 2, 1989

[54] ARRANGEMENT FOR CONNECTING BODIES WHEREIN THERMALLY-RELATED CONSTRAINING FORCES ON THE BODIES ARE MINIMIZED

[75] Inventor: Hans-Jürgen Meier, Aalen, Fed. Rep. of Germany

[73] Assignee: Carl-Zeiss-Stiftung, Heidenheim, Fed. Rep. of Germany

[21] Appl. No.: 176,600

[22] Filed: Apr. 1, 1988

[30] Foreign Application Priority Data

Apr. 4, 1987 [DE] Fed. Rep. of Germany ....... 3711466

[51] Int. Cl.⁴ .............................................. G02B 7/18
[52] U.S. Cl. .................................... 350/609; 350/607; 350/253; 52/573
[58] Field of Search ............... 350/609, 607, 611, 613, 350/253, 321, 631; 52/573

[56] References Cited

U.S. PATENT DOCUMENTS

| 4,282,688 | 8/1981 | Krim ................................. 350/253 |
| 4,693,555 | 9/1987 | Arai et al. .......................... 350/253 |

FOREIGN PATENT DOCUMENTS

| 0063063 | 10/1982 | European Pat. Off. . |
| 918051 | 9/1954 | Fed. Rep. of Germany . |
| 1010802 | 6/1957 | Fed. Rep. of Germany . |
| 2362008 | 6/1975 | Fed. Rep. of Germany ........ 52/573 |
| 2558625 | 7/1977 | Fed. Rep. of Germany . |
| 3012830 | 10/1980 | Fed. Rep. of Germany . |
| 3119299 | 2/1983 | Fed. Rep. of Germany . |
| 140801 | 3/1980 | German Democratic Rep. ..................................... 350/253 |
| 213071 | 8/1984 | German Democratic Rep. ..................................... 350/253 |

OTHER PUBLICATIONS

Boris V. Barlow, "A Low-Cost Temperature-Compensated Mirror Cell", Jour. British Aeron. Assoc., (GB). vol. 86, No. 6, Oct., 1976, pp. 475-477.

SPIE Vo. 250 Optomechanical Systems Design (1980), pages 24 to 26.

Proceedings of the International Society for Optical Engineering, vol. 450 (1983), pages 34 to 38.

Primary Examiner—Jon V. Henry
Attorney, Agent, or Firm—Walter Ottesen

[57] ABSTRACT

The invention is directed to an arrangement for connecting bodies together wherein temperature-induced constraining forces are minimized. It is intended to prevent constraining forces resulting from thermally-induced tensions when connecting two bodies by utilizing a suitable connecting member. The connecting member is wedge-shaped and its temperature movement is compensated for by one or more compensating elements disposed between the connecting member and the bodies to be connected.

10 Claims, 3 Drawing Sheets

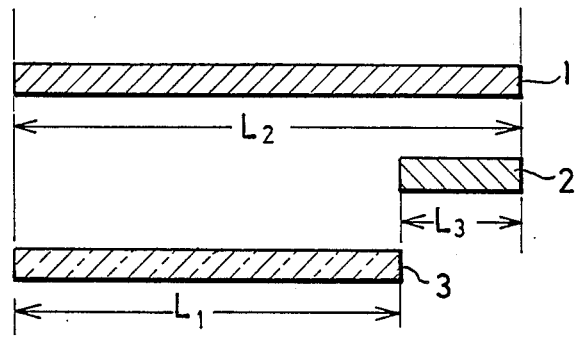
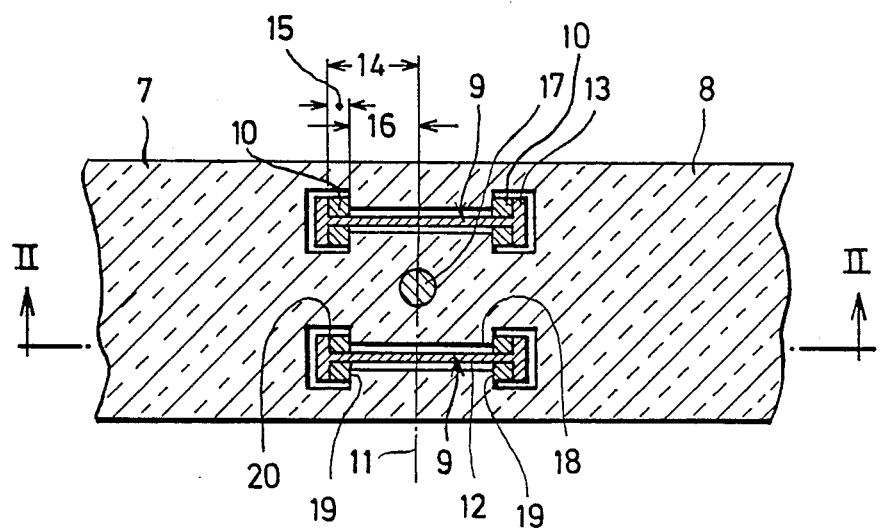

ARRANGEMENT FOR CONNECTING BODIES WHEREIN THERMALLY-RELATED CONSTRAINING FORCES ON THE BODIES ARE MINIMIZED

FIELD OF THE INVENTION

The invention relates to an arrangement for connecting bodies which minimizes the constraining forces on the connecting bodies which result from thermally-induced tensions.

BACKGROUND OF THE INVENTION

The arrangements already known for securing two bodies wherein the thermally-induced stresses are to be minimized utilize in large measure radially yielding connecting members which constitute an otherwise rigid connection. European Patent publication No. 00 63 063 discloses a radio telescope wherein one connecting point is maintained while other connecting points each permit a change in radial direction. Here, radially yielding attachment members are used which function in the manner of leaf springs.

It is also known to attach a glass mirror to a metal supporting structure by means of radially flexible elements. In this connection, reference may be made to the proceedings of the International Society for Optical Engineering, volume 250 (1980), pages 24 to 26 and volume 450 (1983), pages 34 to 38. This type of attachment leads to very complicated attachment systems which in addition lead to a certain inclination to oscillate.

Also, German Pat. No. 31 19 299 discloses an attachment achieved by means of an elastic adhesive connection. However, the use of cementing technology has several disadvantages. On the one hand, an ideal cement thickness of zero is not attainable while, on the other hand, the locations where the cement is applied have a reduced stiffness and are not releasable.

German Pat. No. 30 12 830 discloses the correction of surface deformations by means of piezo-electric material with an active adjustment occurring.

From German Pat. Nos. 10 10 802 and 25 58 625 it is known in the area of machine tools to provide a compensation of thermal expansion by means of expansion rods. This construction technique leads to a very large configuration and is only effective at points. This principle is also utilized in the area of clock pendulums.

Many types of attachment have the disadvantage that thermal expansion causes a displacement of the attachment points. This disadvantage being either that constraining forces can be transmitted from the structure of the carrier to the component or that the stiffness of the connection is minimal. Impermissible deformations can even occur with relatively small constraining forces whereby the utilization is no longer present or at least very greatly reduced. In the application of optical elements such as telescope mirrors, very high requirements are imposed upon their surface contour and these requirements can lie in the range of several nanometers. Especially in optical elements of this kind, even low forces lead to determinable deformations of the surface which greatly reduce the usability of the optical component. If additional increased rigidity and strength requirements are imposed, the above-described attachment methods cannot fulfill the requirements.

German Pat. No. 918,051 discloses a compensation body which is dimensioned and arranged so that changes in length of a supporting structure and a compensating body induced by temperature influences cancel each other with reference to a measurement distance. Two measurement legs with compensating rods are provided at the ends of this supporting structure. As disclosed in the introduction of German Pat. No. 918,051, this invention utilizes two materials having different coefficients of expansion for the purpose of matching the coefficients of expansion.

Furthermore, clamping connections are generally known. Thus, wedge-shaped tie rods are known in the furniture industry where they are utilized for connecting, for example, individual parts of a cabinet.

SUMMARY OF THE INVENTION

It is an object of the invention to provide a tight connection between two bodies which extends over a large length and which is releasable as may be required and which applies the least possible thermally-induced constraining forces in the presence of high rigidity.

The arrangement according to the invention connects bodies wherein constraining forces on the bodies which result as a consequence of thermally-induced tensions are minimized.

The arrangement of the invention includes: a seam interface conjointly defined by the bodies at which the bodies are joined to each other; recess means formed in the bodies along the interface; a wedge-shaped connecting member disposed in the recess means for imparting a holding force to the bodies to join the bodies to each other; and, thermal compensating means braced between the bodies and the connecting member so as to cause the force developed by the connecting member to be substantially uniform over a preselected temperature range.

In the practical application of the connecting member, care must be taken that the following known principle of temperature compensation is not violated:

$$\sum_{k=1}^{m} \alpha_b L_b = \alpha_k L_k - \sum_{i=1}^{n} \alpha_i L_i; \; n, m \in N$$

wherein:

$\alpha_b$ is the linear coefficient of expansion of the segments to be connected;

$L_b$ is the component length of the segments to be connected;

$\alpha_i$ is the linear coefficient of expansion of the joining compensating members;

$L_i$ is the component length of the connecting compensating members;

$\alpha_k$ is the linear coefficient of expansion of the wedge-shaped connecting member; and, $L_k$ is the component length of the wedge-shaped connecting member.

The above means that the thickness of the compensating members on the wedge-shaped connecting member is not constant over the length of the connecting member. However, the thickness of the compensating member is generally very easy to determine because of the simple geometric relationships. In general, when the two bodies to be connected are made of a homogeneous material such as glass or ZERODUR ceramic, the thickness of the compensating linings can be determined from a measurement at both ends of the attachment length and at both ends of the connecting member. The dimensions are therefore generally determined with the aid of a computer. The arrangement according to the invention provides a solution even if both bodies to be connected are made of different homogeneous materials by means of a separate evaluation of both sides. A profile of the occurring coefficients of expansion must be determined over the length of the wedge only for non-homogeneous bodies and this is then considered when manufacturing the compensating linings and the wedge-shaped connecting member. The profile obtained in this manner is advantageously considered during the construction of the connecting member in that the structure only occurs between the connecting member and the compensating member and that an otherwise smooth surface is provided on the outer surface.

If a thermal compensation is to be obtained over a second temperature range, then a consideration of the linear coefficient of expansion $\alpha$ is not adequate. The coefficient of expansion $\alpha$ is a temperature-dependent material characteristic and is different in various temperature ranges. The average values $\alpha_{t1}{}^{t2}$ given in tables for the material are then not adequate and a matching of the coefficients of expansion in the temperature range wherein compensation is to be provided must be achieved by optimizing by means of a suitable combination of several compensating layers on the base body.

A second essential condition arises from the requirement that the difference of the component length corresponds to the parts to be connected. This can be expressed by the following equation:

$$\sum_{k=1}^{m} L_b = L_k - \sum_{i=1}^{n} L_i; \; n,m \epsilon N$$

The wedge-shaped configuration of the connecting member is necessary to obtain a tight attachment which acts along a large length.

The requirement for a gap thickness of virtually zero in contrast to that obtained using cementing techniques is realized by means of the temperature-compensated attachment with appropriate processing of the mutually contact engaging surfaces at the seam of the components to be attached. Furthermore, a high rigidity is obtained along the entire connecting length of the seam of the bodies by means of the wedge-shaped configuration of the connecting member.

Not only bodies with the same coefficient of expansion can be connected to each other with the arrangement according to the invention. The arrangement of the invention is also applicable for connecting bodies having different coefficients of expansion which becomes manifest from the general equations for the practical application.

The compensation between the component and the connecting member can also be achieved by means of only one compensating layer on the wedge-shaped connecting member if it is assured that the same coefficient of friction $\mu$ between the contact surfaces of the components and of the connecting member is provided by means of a surface processing.

It is especially advantageous if the length of the connecting member corresponds to the length of the seam between the bodies to be connected. The forces which are necessary for a tight connection between the bodies to be connected can then be optimally distributed over a large surface and the loading occurring at the interfaces of the bodies to be connected can be held to a minimum. By utilizing two connecting members in combination with an interlocking member disposed between the connecting members, an optimal positioning stability of the seams with respect to each other can be obtained. The body utilized as an interlocking member should be made of the material of the bodies to be fastened or, when the bodies to be fastened are made of different materials, then the body used as an interlocking member should be made of the different materials.

According to an advantageous embodiment of the invention, the connecting member is a wedge-shaped tie bar having holding portions formed thereon and which includes compensating members interposed between its holding portions and the contact surfaces of the bodies to be connected. The contact surface of the compensating member with the bodies to be connected can then be made of a material which has a very low coefficient of friction $\mu$. It is most important that this aspect be then considered when the compensating member in the form of a compensating lining is made of several materials having different respective coefficients of expansion. This multi-layer configuration of the compensating lining is then provided when a temperature compensation of the connecting member with the bodies to be connected is sought over a wide temperature range.

Since mostly large parts can be connected advantageously with each other by utilizing wedge-shaped connecting members, it is a special advantage of the arrangement of the invention that the bodies to be connected to each other can be again disassembled without damage and, after transport to the site where they are to be used, a controlled assembly can be made. This is possible only very seldom in the area of optics.

The invention is especially advantageous in the construction of telescope mirrors because of the very high requirements as to precision. With the arrangement of the invention, the segments of a large mirror can be joined together. The obtainable dimensions of a primary mirror are much greater than those of available massive mirrors made from a casting.

BRIEF DESCRIPTION OF THE DRAWINGS

The invention will now be described with reference to the drawings wherein:

FIG. 1 is a schematic representation showing the principal of temperature compensation;

FIG. 3 is an elevation view, in section, taken along line III—III of FIG. 2; and, FIG. 4 is a partial view showing a compensating member made up of a plurality of layers of different materials and interposed between the holding portion of the connecting member and a contact engaging surface of one of the two segments.

DESCRIPTION OF THE PREFERRED
EMBODIMENTS OF THE INVENTION

FIG. 1 shows the general principle of temperature compensation. In FIG. 1, $\alpha_2$ is the linear coefficient expansion and $L_2$ is the length to be considered in the computation for the first material 1. On the other hand, $\alpha_3$ is the linear coefficient of expansion and $L_3$ is the length to be considered in the computation of the second material 2. Then, for an optimal temperature compensation, the difference of the products $\alpha_2 \cdot L_2$ and $\alpha_3 \cdot L_3$ must correspond to the product of the linear coefficient of expansion $\alpha_1$ and the length $L_1$ to be considered in the computation. Furthermore, the difference of the two lengths $L_2$ and $L_3$ of the temperature-compensated connecting member must correspond to the length $L_1$.

Figure 2:
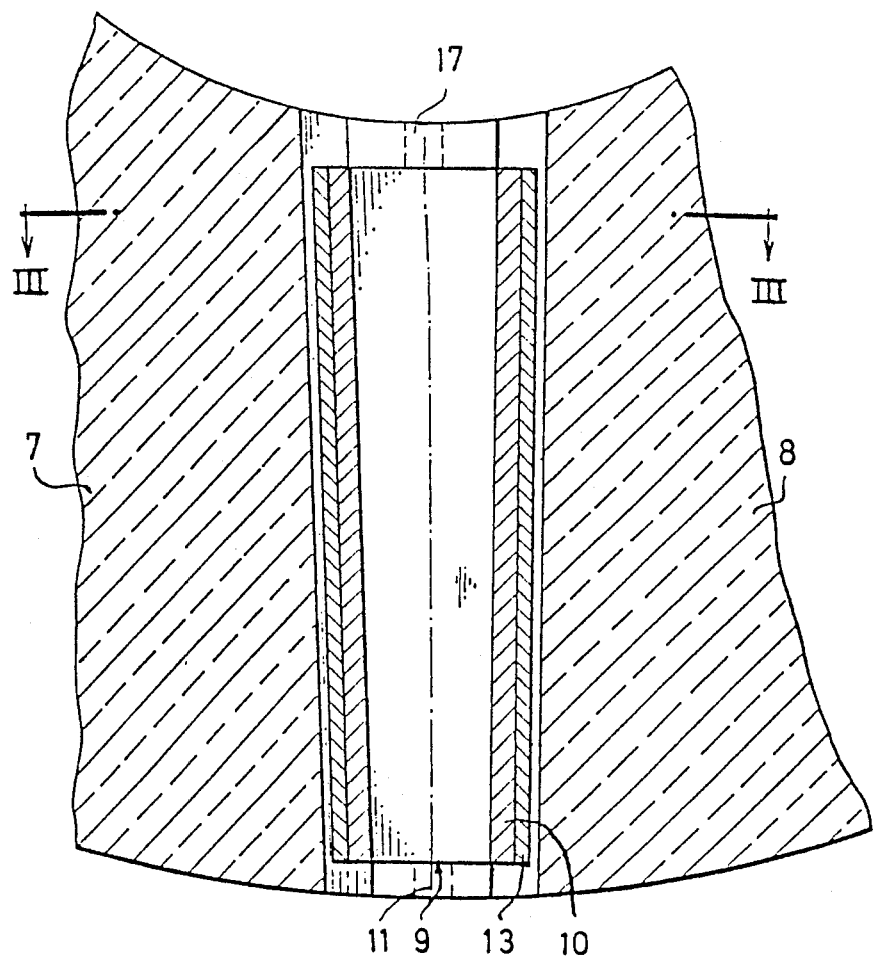
FIG. 2 is a plan view, in section, which is taken along line II—II of FIG. 3 and shows two segments of a large optical unit connected to each other by means of the connecting arrangement according to a preferred embodiment of the invention.

FIG. 2 shows the use of a temperature-compensated wedge-shaped connecting member 9 for connecting two bodies in the form of segments (7, 8) for producing a large optical member in the form of a mirror. In this application, it is essential that the seam 11 conjointly defined by the segments (7, 8) have no temperature variation. The processing of the mirror surface is performed after the segments (7, 8) of the mirror are tightly joined together.

The connecting member 9 has an I-section and includes a web 12 and flange-like holding portions 13 at respective ends thereof. The connecting member 9 is disposed in a composite recess 18 in the segments (7, 8) and extends to the left and right of seam 11.

The compensating members 10 are located at the holding portions 13 of the wedge-shaped connecting member 9. If an appropriate combination of the respective materials of the connecting member 9 and the compensating members 10 with reference to the length to be utilized is present, then no variations with respect to the forces acting at the seam 11 will occur in response to different temperatures. The segments (7, 8) have sets of respective contact engaging surfaces 19 formed thereon. The contact engaging surfaces are spaced from each other a distance corresponding to twice the spacing 16 shown in FIG. 3.

FIG. 3 is a section view taken through both segments (7, 8) of the mirror. The wedge-shaped connecting member 9 connects the two segments (7, 8) made of ZERODUR ceramic. The holding flanges 13 and the web 12 of the connecting member 9 are made of INVAR steel and each holding flange is braced against the compensating member 10 in the form of wedge-shaped aluminum blocks. In the surrounding of the connecting member 9 there must be enough place 18 for the connecting member 9 to be out of contact at every temperature with the two connected bodies (7, 8). This place 18 is also useful between the compensating members 10 and the stick 12 of the connecting member 9.

Referring to both FIGS. 1 and 3, the following quantities are utilized in an examination as to whether the conditions for a temperature compensation are fulfilled:

$\alpha_1$ is the linear coefficient of expansion of the material of the mirror segment (ZERODUR ceramic);

$L_1$ is the spacing 16 between the seam 11 and the interface conjointly defined by the contact engaging surface 19 of the segment 7 and compensating member 10 held on the flange 13 of the connecting member 9;

$\alpha_2$ is the linear coefficient of expansion of the flange 13 of the connecting member 9 made of INVAR steel;

$L_2$ is the spacing 14 between seam 11 and the interface 20 conjointly defined by the flange 13 and the compensating member 10;

$\alpha_3$ is the linear coefficient of expansion of the compensating member 10 of the connecting member 9 with the compensating member 10 being made of aluminum; and, $L_3$ is the spacing 15 between the interface 20 and the interface at which compensating member 10 lies against the contact engaging surface 19 of the segments (7, 8).

In the embodiments described, the values are as follows:

$\alpha_1 \sim 0.1 \cdot 10^{-6} \, 1/^{\circ}k$ $\alpha_2 \sim 2.4 - 2.8 \cdot 10^{-6} \, 1/^{\circ}k$ $\alpha_3 \sim 20 - 26 \cdot 10^{-6} \, 1/^{\circ}k$ First condition: $\alpha_1 \cdot L_1 = \alpha_2 \cdot L_2 - \alpha_3 \cdot L_3$ Second condition: $L_1 = L_2 - L_3$ It is to be noted that the values given above apply only approximately. The actual linear coefficient of expansion o is a temperature-dependent characteristic of the material and it changes linearly with temperature only in certain ranges. For this reason, it may be required that the compensating lining be built up from several layers of different materials having different thicknesses in order to obtain the largest possible correspondence with the non-linear changes of the expansion coefficient of the materials to be connected in the relevant temperature range.

The final processing of the mirror can be performed after an interlocking member in the form of a ZERODUR ceramic cylinder 17 is inserted for keying and after the individual segments are brought into their final position with the two temperature-compensated wedge-shaped connecting members 9 to achieve a wedging effect.

Figure 4:
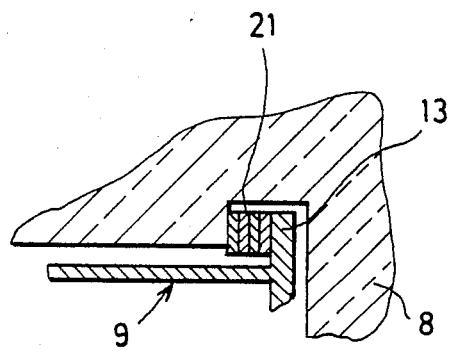

According to another feature of the invention, the compensating member 10 can have a multi-layer configuration as shown in FIG. 4 wherein the multi-layered compensating member as identified by reference numeral 21. The plurality of layers of compensating member 21 are sandwiched together so as to extend parallel to the contact engaging surface 19 and the holding portion 13 of the connecting member 9.

It is understood that the foregoing description is that of the preferred embodiments of the invention and that various changes and modifications may be made thereto without departing from the spirit and scope of the invention as defined in the appended claims.

What is claimed is:

1. An arrangement for connecting bodies wherein constraining forces are developed as a consequence of thermally-induced tensions, the arrangement comprising:

a seam interface conjointly defined by said bodies at which said bodies are joined to each other;

recess means formed in said bodies along said interface;

a wedge-shaped connecting member disposed in said recess means for imparting a holding force to said bodies to hold said bodies to each other; and, thermal compensating means braced between said bodies and said connecting member so as to cause said force developed by said connecting member to be substantially uniform over a preselected temperature range.

2. The arrangement of claim 1, said bodies having respective contact engaging surfaces formed thereon and spaced a predetermined first distance from each other measured in a direction transverse to said seam interface; said wedge-shaped connecting member being made of a first material and including first and second holding portions formed thereon for imparting said holding force to said contact engaging surfaces to hold said bodies together; said thermal compensating means comprising a thermal compensating member made of a second material and interposed between said first holding portion and the corresponding one of said contact engaging surfaces with said compensating member and said one contact engaging surface conjointly defining an additional interface; said first holding portion and said compensating member being spaced from said second holding portion a predetermined second distance measured from said additional interface to said second holding means in a direction transverse to said seam interface; said materials and said predetermined second distance being selected so as to cause said second distance to correspond to said first distance over said preselected temperature range.

3. The arrangement of claim 2, said thermal compensating member being fixedly attached to said first holding portion.

4. The arrangement of claim 1, said bodies having respective contact engaging surfaces formed thereon; said wedge-shaped connecting member including first and second holding portions formed thereon for imparting said holding force to said contact engaging surfaces to hold said bodies together; and, said thermal compensating means comprising a first compensating member interposed between said first holding portion and one of said contact engaging surfaces and a second compensating member interposed between said second holding portion and the other one of said contact engaging surfaces.

5. The arrangement of claim 4, each of said compensating members being made of a material having a low coefficient of friction $\mu$ at the contact engaging surface corresponding thereto.

6. The arrangement of claim 1, said bodies having respective contact engaging surfaces formed thereon; said wedge-shaped connecting member including first and second holding portions formed thereon for imparting a holding force to said contact engaging surfaces to hold said bodies together; said thermal compensating means comprising a thermal compensating member interposed between said first holding portion and one of said contact engaging surfaces; and, said thermal compensating member including a plurality of materials placed together so as to increase said temperature range.

7. The arrangement of claim 1, said plurality of materials being configured as a plurality of layers sandwiched together so as to extend parallel to said one contact engaging surface and said first holding portion.

8. The arrangement of claim 1, said connecting member having a length corresponding to the length of said seam interface.

9. The arrangement of claim 1, said bodies having respective contact engaging surfaces spaced from said seam interface and tapering toward the latter in correspondence to the wedge-shaped configuration of said connecting member thereby facilitating the repeated removal and reinsertion of said connecting member for facilitating disassembly and reassembly of said bodies.

10. The arrangement of claim 1, said bodies being the segments of a large mirror.

* * * * *

UNITED STATES PATENT AND TRADEMARK OFFICE
CERTIFICATE OF CORRECTION

PATENT NO. : 4,826,303

DATED : May 2, 1989

INVENTOR(S) : Hans-Jürgen Meier

It is certified that error appears in the above-identified patent and that said Letters Patent is hereby corrected as shown below:

In column 3, line 20, delete "$\alpha_{t1}{}^{t2}$" and substitute -- $\alpha_{t_1}{}^{t_2}$ -- therefor.

In column 5, line 57: insert -- the -- between "between" and "seam 11".

In column 6, delete line 4 and substitute

-- First condition: $\alpha_1 \cdot L_1 = \alpha_2 \cdot L_2 - \alpha_3 \cdot L_3$ -- therefor.

In column 6, line 8, delete "sion o" and substitute -- sion $\alpha$ -- therefor.

Signed and Sealed this

Twelfth Day of December, 1989

Attest:

JEFFREY M. SAMUELS

Attesting Officer     Acting Commissioner of Patents and Trademarks